(12) United States Patent
Watanabe et al.

(10) Patent No.: US 7,224,148 B2
(45) Date of Patent: May 29, 2007

(54) VEHICLE POWER-GENERATION CONTROL UNIT

(75) Inventors: Kazuyuki Watanabe, Kariya (JP); Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/257,158

(22) Filed: Oct. 25, 2005

(65) Prior Publication Data
US 2006/0091864 A1 May 4, 2006

(30) Foreign Application Priority Data
Oct. 25, 2004 (JP) .............................. 2004-309784

(51) Int. Cl.
*H02K 7/00* (2006.01)
*H02P 9/00* (2006.01)

(52) U.S. Cl. ............................. 322/59; 322/28; 322/45; 322/99

(58) Field of Classification Search .................. 322/24, 322/25, 27, 28, 37, 45, 59, 60, 89, 99
See application file for complete search history.

(56) References Cited

U.S. PATENT DOCUMENTS

| | | | |
|---|---|---|---|
| 5,157,321 A | | 10/1992 | Kato et al. |
| 5,719,485 A | * | 2/1998 | Asada .......................... 322/28 |
| 5,754,030 A | * | 5/1998 | Maehara et al. ............... 322/19 |
| 6,271,649 B1 | * | 8/2001 | Iwatani ......................... 322/29 |
| 6,456,048 B2 | * | 9/2002 | Taniguchi et al. ............. 322/28 |
| 6,707,276 B2 | * | 3/2004 | Takahashi et al. ............. 322/28 |
| 6,867,569 B2 | * | 3/2005 | Taniguchi et al. ............. 322/28 |
| 7,106,028 B2 | * | 9/2006 | Iwatani ......................... 322/28 |
| 7,170,263 B2 | * | 1/2007 | Yamamoto et al. ............ 322/59 |

FOREIGN PATENT DOCUMENTS

| | | |
|---|---|---|
| JP | A 03-060338 | 3/1991 |
| JP | A 05-260679 | 10/1993 |
| JP | A 2002-204600 | 7/2002 |

* cited by examiner

*Primary Examiner*—Nicholas Ponomarenko
(74) *Attorney, Agent, or Firm*—Oliff & Berridge, PLC

(57) ABSTRACT

The vehicle power-generation control unit includes a voltage detecting circuit detecting a generation voltage of a vehicle generator driven by a vehicle engine, a switching device allowing an exciting current to flow into an exciting winding of the vehicle generator when the switching device is in an on state, an average duty ratio detecting circuit detecting a temporal average duty ratio of the switching device on the basis of the generation voltage, an enhanced duty-cycle signal generating circuit generating an enhanced duty-cycle signal having a duty ratio equal to the temporal average duty ratio added with a supplementary duty ratio determined depending on at least one of vehicle state information and vehicle generator state information, and a driver circuit driving the switching device with the duty ratio of the enhanced duty-cycle signal when the generation voltage detected by the voltage detecting circuit is lower than a predetermined target voltage.

8 Claims, 4 Drawing Sheets

VEHICLE POWER-GENERATION CONTROL UNIT

CROSS-REFERENCE TO RELATED APPLICATION

This application is related to Japanese Patent Application No. 2004-309784 filed on Oct. 25, 2004, the contents of which are hereby incorporated by reference.

BACKGROUND OF THE INVENTION

1. Field of the Invention

The present invention relates to a vehicle power-generation control unit capable of performing gradual excitation for a vehicle generator.

2. Description of Related Art

As disclosed, for example, in Japanese Patent Application Laid-open No. 3-60338, there is known a vehicle power-generation control unit configured to gradually increase the exciting current of a vehicle generator when the output voltage of the vehicle generator drops as a result of application of an electrical load. With this vehicle power-generation control unit, it is possible to avoid abrupt lowering of a rotational speed of a vehicle engine, because, even when the output voltage of the vehicle generator drops abruptly as a result of application of an electrical load, the duty ratio of the exciting current flowing through the exciting winding of the vehicle generator is increased only gradually in order to avoid abrupt increase of the power generation torque.

There is also known a vehicle power-generation control unit configured to perform such a gradual-excitation control only for continuous electrical loads, and not for intermittent electrical loads such as a turn signal lamp and a hazard flasher as disclosed, for example, in Japanese Patent Application Laid-open No. 5-260679. This vehicle power-generation control unit makes it possible to avoid fluctuation of the output voltage of the vehicle generator, which can occur if the gradual excitation control is performed for the intermittent electrical loads, to thereby avoid the occurrence of brightness fluctuation of the turn signal lamp or hazard flasher. Determination whether an electrical load applied is a continuous load or an intermittent load can be made, for example, on the basis of the output voltage of the vehicle generator. In addition, this vehicle power-generation control unit has a capability of changing a gradual excitation time (the time span during which the duty ratio of the exciting current is gradually increased).

Since the increasing rate of the output power of the vehicle generator when the exciting current is increased gradually depends on the temperature and the rotational speed of the vehicle generator, it is also known to adjust the increasing rate of the duty ratio of the exciting current in accordance with the rotational speed and the temperature of the vehicle generator, as disclosed, for example, in Japanese Patent Application Laid-open No. 2002-204600.

However, the vehicle power-generation control unit disclosed in Japanese Patent Application Laid-open No. 3-60338, in which the increasing rate of the exciting current is constant, has a problem in that a terminal voltage of a vehicle battery (may be referred to as a battery voltage hereinafter) can be lowered excessively, and the engine speed can become unstable depending on the magnitude of an electrical load applied.

Also, the vehicle power-generation control units disclosed in Japanese Patent Applications Laid-open No. 3-60338, No. 5-260679, and No. 2002-204600 have a common problem in that the engine speed can become unstable and the battery voltage can be lowered excessively depending on a vehicle state (an engine torque state, for example) when a large electrical load having an inrush current such as an electric motor is applied.

SUMMARY OF THE INVENTION

The present invention provides a vehicle power-generation control unit including:

a voltage detecting circuit detecting a generation voltage of a vehicle generator mounted on a vehicle and driven by an engine of the vehicle;

a switching device allowing an exciting current to flow into an exciting winding of the vehicle generator when the switching device is in an on state;

an average duty ratio detecting circuit detecting a temporal average duty ratio of the switching device on the basis of the generation voltage;

an enhanced duty-cycle signal generating circuit generating an enhanced duty-cycle signal having a duty ratio equal to the temporal average duty ratio detected by the average duty ratio detecting circuit added with a supplementary duty ratio determined depending on at least one of vehicle information representing a state of the vehicle and vehicle generator information representing a state of the vehicle generator; and a driver circuit driving the switching device with the duty ratio of the enhanced duty-cycle signal generated by the enhanced duty-cycle signal generating circuit when the generation voltage detected by the voltage detecting circuit is lower than a predetermined target voltage.

With the present invention, it is possible to avoid the engine speed from becoming unstable by gradually increasing the duty ratio of the switching device (or the duty ratio of the exciting current) when an electrical load is applied. In addition, by setting the supplementary duty ratio at a smaller value while the vehicle engine idles, and changing it to a larger value after the engine speed rises, it becomes possible to recover the battery voltage quickly without making the engine speed unstable when a large electrical load is applied.

With the present invention, it is also possible to ease the battery voltage drop by sharply increasing the supplementary duty ratio when an electrical load having an inrush current or an electrical load requiring a large step current such as the electric power steering system or the ABS (Anti-lock Brake System) is applied. This avoids malfunction of the ECU (Engine Control Unit) and vehicle safety running device of the vehicle such as the electric power steering system and the ABS due to the low output voltage of the vehicle generator and the resultant battery voltage drop.

PREFERRED EMBODIMENTS OF THE INVENTION

Figure 1:
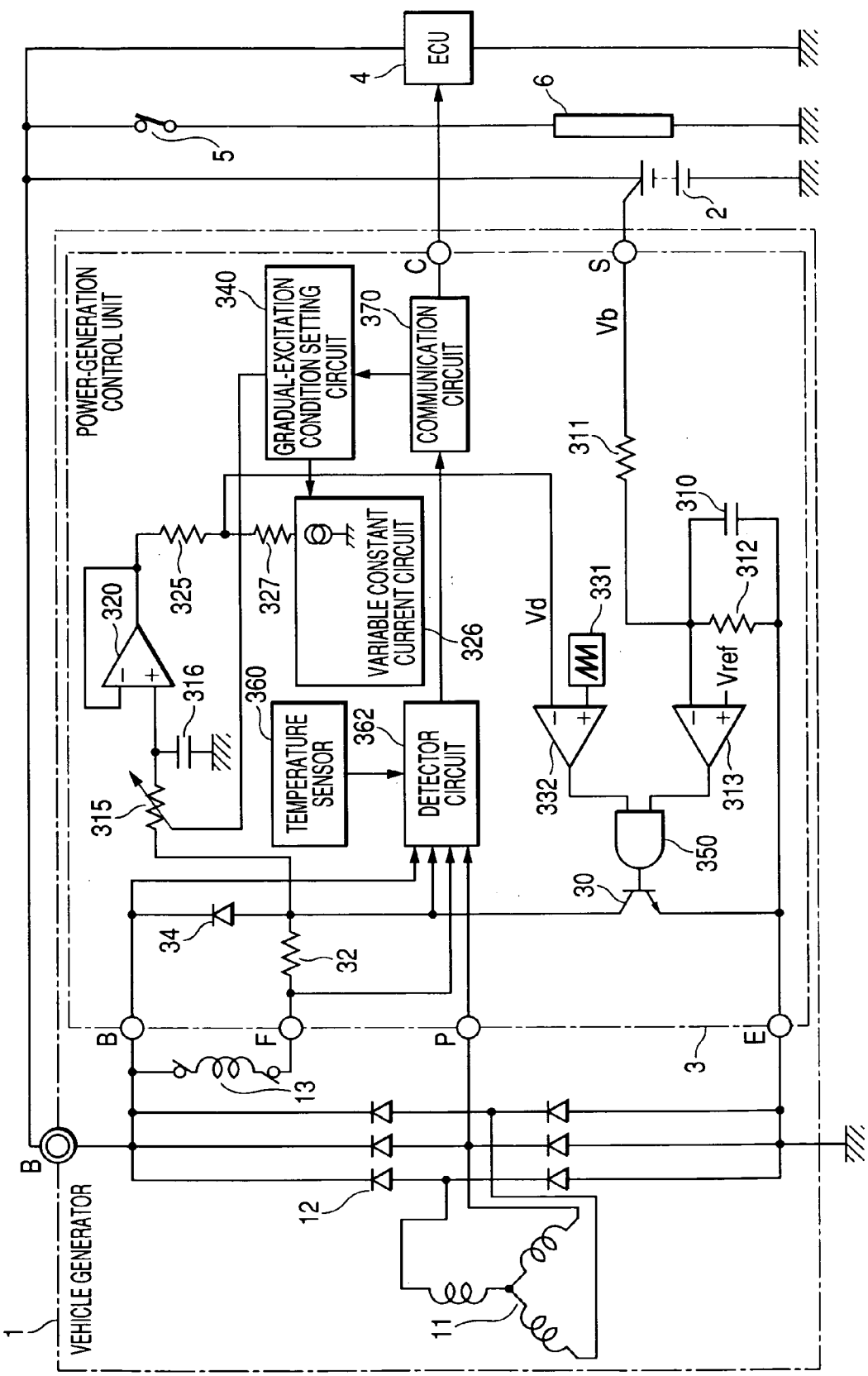
FIG. 1 is a diagram showing a configuration of a vehicle power-generation control system including a vehicle power-generation control unit according to an embodiment of the invention.

FIG. 1 is a diagram showing a configuration of a vehicle power-generation control system including a vehicle generator 1 provided with a vehicle power-generation control unit 3 according to an embodiment of the invention, a battery 2, and an ECU (Engine Control Unit) 4 as an external control unit. As shown in this figure, the vehicle generator 1 includes, other than the vehicle power-generation control unit 3, a stator having a three-phase stator winding 11, a rectifier 12 for full-wave rectifying the three-phase output of the stator winding 11, a rotor having an exciting winding 13. The output terminal (B terminal) of the vehicle generator 1 is connected to a positive terminal of the battery 2 through a conductive wire, and also to an electrical load 6 by way of a selector switch 5. The power-generation control unit 3 is connected to the positive terminal of the battery 2 at an S terminal thereof through a conductive wire, and to the ECU 4 at a C terminal C thereof through a signal cable.

Next, the configuration of the power-generation control unit 3 is explained.

The exciting current flowing through the exciting winding 13 is on/off-controlled by a switching transistor 30 series-connected to the exciting winding 13 through a resistor 32. The exciting current flowing through the exciting winding 13 is detected by the resistor 32 connected between an F terminal to which one end of the exciting winding 13 is connected and a node of the collector of the switching transistor 30 and an anode of a free-wheel diode 34 whose cathode is connected to the other end of the exciting winding 13. The free-wheel diode 34 is for allowing a current caused by a high voltage induced across the exciting winding 13 when the switching transistor 30 is turned off to circulate across the exciting winding 13.

A capacitor 310, resistors 311, 312, and a voltage comparator 313 constitute a voltage control circuit which compares a voltage proportional to the battery voltage (or generation voltage) with a predetermined reference voltage Vref, and outputs a low-level signal or a high-level signal depending on the result of the comparison. More specifically, the battery voltage Vb (the terminal voltage of the battery 2) applied to the S terminal is divided down by a voltage divider circuit constituted by the resistors 311, 312, and is applied to the negative terminal of the voltage comparator 313. The voltage comparator 313 outputs the high level signal when the divided battery voltage applied to the negative terminal thereof is lower than the reference voltage Vref applied to the positive terminal thereof, and outputs the low level signal when the divided battery voltage is not lower than the reference voltage Vref. When the output voltage of the vehicle generator 1 is lowered by the application of the electrical load 6, and as a result, the battery voltage becomes lower than a target voltage Vc corresponding to the reference voltage Vref, the voltage comparator 313 outputs the high level signal.

A variable resistor 315 and a capacitor 316 constitute an average duty ratio detector circuit for detecting a temporal average duty ratio (referred to as simply an average duty ratio) of the switching transistor 30. When the switching transistor 30 is in the on state, the voltage at the F terminal is low, because the F terminal connected to the exciting wining 13 is grounded through the resistor 32. During this on state, a current flows towards the F terminal from the capacitor 316 through the variable resistor 315, and the capacitor 316 is therefore discharged. On the other hand, when the switching transistor 30 is in the off state, the voltage at the terminal F is high. During this off state, a current flows towards the capacitor 316 from the side of the F terminal through the variable resistor 315, and the capacitor 316 is therefore charged. Hence, the average duty ratio of the switching transistor 30 can be determined on the basis of the terminal voltage of the capacitor 316.

An impedance conversion circuit 320 receives the output voltage of the average duty ratio detector circuit constituted by the variable resistor 315 and the capacitor 316 at a high impedance input terminal thereof, and outputs the same voltage as this received voltage. The impedance conversion circuit 320 may be a voltage follower circuit constituted by an operational amplifier whose output terminal is connected to an inverting input terminal thereof.

A series of a resistor 325, a resistor 327, and a variable constant-current circuit 326 constitute a voltage-lowering circuit for lowering the output voltage of the impedance conversion circuit 320. The value of the constant current produced by the variable constant-current circuit 326 can be changed by a gradual-excitation condition setting circuit 340. The output voltage of the impedance conversion circuit 320 is lowered by a value of the voltage drop across the resistor 325 through which the constant current produced by the variable constant-current circuit 326 flows. In this embodiment, the resistance of the resistor 325 is about 4 K Ω.

A triangular-wave signal generation circuit 331 and a voltage comparator 332 constitute an enhanced duty-cycle signal generation circuit generating an enhanced duty-cycle signal. The enhanced duty-cycle signal is a rectangular wave signal having a duty ratio corresponding to the output voltage of the impedance conversion circuit 320 which has been lowered by the value of the voltage drop across the resistor 325. The voltage comparator 332 receives at its negative input terminal the output voltage of the impedance conversion circuit 320 lowered by the voltage-lowering circuit constituted by the resistor 325 and the variable constant-current circuit 326, and receives at its positive input terminal a triangular-wave signal generated by the triangular-wave signal generation circuit 331. The triangular-wave signal generated by the triangular-wave signal generation circuit 331 has a peak voltage of 4V, a bottom voltage of 0V, and a period T of 20 msec.

In this embodiment, when the average duty ratio of the switching transistor 30 is 50%, the output voltage of the average duty ratio detector circuit constituted by the variable resistor 315 and the capacitor 316 (or the terminal voltage of the capacitor 316) becomes 2V, and the voltage Vd applied to the negative terminal of the voltage comparator 332 has a value lower than the value of the output voltage of the average duty ratio detector circuit (which is equal to 2V) by the value of the voltage drop across the resistor 325. At this time, the voltage comparator 332 outputs a rectangular-wave voltage signal having a period of 20 msec and a duty ratio of (50+α) % as the enhanced duty-cycle signal. Here, α represents a supplementary duty ratio depending on the value of the voltage drop across the resistor 325.

An AND circuit 350 serving as a driver circuit applies the base of the switching transistor 30 with a logical AND of the output signal of the voltage comparator 313 and the enhanced duty-cycle signal outputted from the voltage comparator 332.

Generator information is detected by a detector circuit 362. In this embodiment, the generator information includes the temperature, rotational speed, output voltage, and exciting current of the vehicle generator 1. The temperature of the vehicle generator 1 is sensed by a temperature sensor 360. The rotational speed of the vehicle generator 1 can be determined by receiving the voltage across one of the phase windings of the stator winding 11 through the P terminal, and measuring the frequency of the received voltage. The value of the output voltage of the vehicle generator 1 can be determined as the value of the voltage at the B terminal. The value of the exciting current of the vehicle generator 1 can be determined on the basis of the value of the voltage drop across the resistor 32.

Data transmission with the ECU 4 is performed by a communication circuit 370 cable-connected to the ECU 4 through the C terminal. The power-generation control unit 3 sends generator information about the vehicle generator 1 detected by the detector circuit 362 to the ECU 4. On the other hand, the ECU sends gradual-excitation condition information including commands regarding the value of the supplementary duty ratio α and an increasing rate of the exciting current to the power-generation control unit 3.

Figure 2:
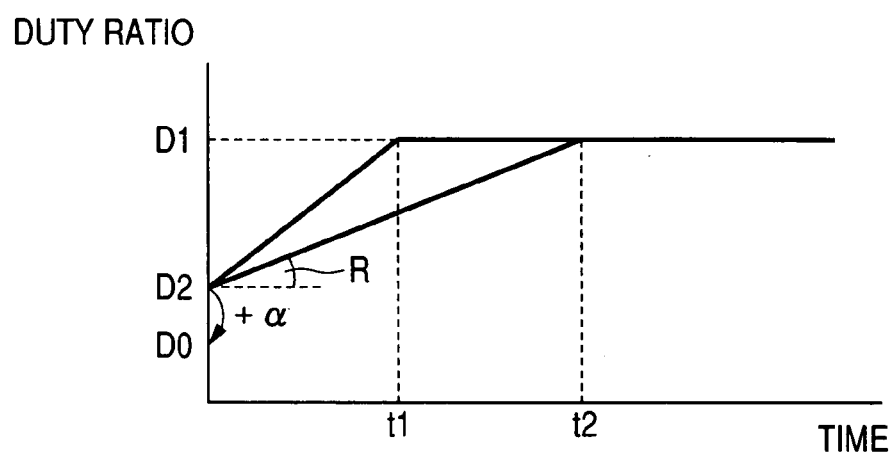
FIGS. 2 and 3 are diagrams for explaining how the duty ratio of an exciting current is controlled when an electrical load is applied.

Next, explanation is made about the increasing rate of the duty ratio of the exciting current in a case where the duty ratio is increased from the current value of D0 to an upper limit value of D1 with reference to FIG. 2.

When the electrical load 6 is applied, the terminal voltage of the battery 2 is lowered, and accordingly, the output signal of the voltage comparator 313 becomes high. At this time, the voltage comparator 332 is outputting the enhanced duty-cycle signal having a duty ratio D2 which is equal to the duty ratio D0 corresponding to the output voltage of the capacitor 316 plus the supplementary duty ratio α corresponding to the voltage drop across the resistor 325. Accordingly, the switching transistor 30 is driven with the duty ratio of D2 from the time at which the output signal of the voltage comparator 313 becomes high. In this case, the duty ratio with which the switching transistor 30 is driven increases from D2 to D1 gradually as shown in FIG. 2, because the output voltage of the average duty ratio detector circuit constituted by the variable resistor 315 and the capacitor 316 decreases gradually at a rate depending on the time constant determined by the resistance of the variable resistor 315 and the capacitance of the capacitor 316. The increasing rate of the duty ratio in this case is represented by the slope R in FIG. 2. The inclination of the slope R can be changed by changing the resistance of the variable resistor 315 through the gradual-excitation condition setting circuit 340. When the resistance of the variable resistor 315 is set small, the inclination of the slope R becomes steep, and the time required for the duty ratio to reach D1 becomes short (t1 in FIG. 2). On the other hand, when the resistance of the variable resistor 315 is set large, the slope R becomes gentle, and the time required for the duty ratio to reach D1 becomes long (t2 in FIG. 2).

Figure 3:
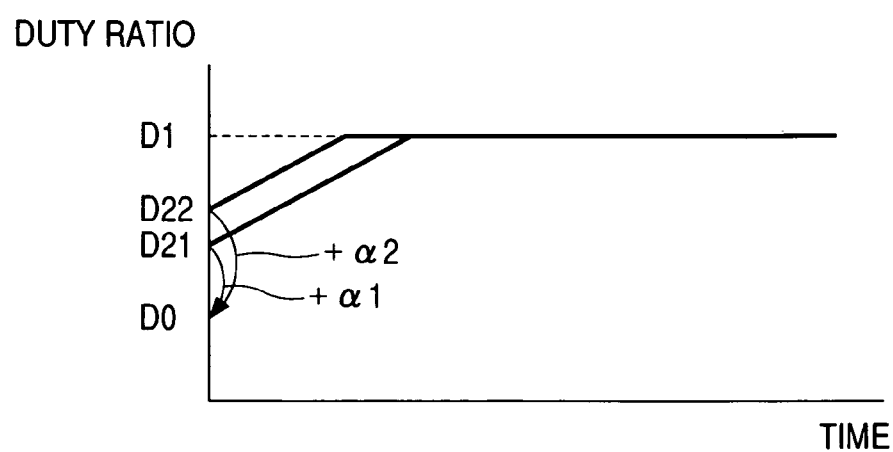

Next, explanation is made about the value of the supplementary duty ratio α of the exciting current with reference to FIG. 3.

The value of the supplementary duty ratio α, which depends on the value of the voltage drop across the resistor 325, can be changed by changing the value of the constant current produced by the variable constant current circuit 326. When the constant current produced by the variable constant current circuit 326 is set large, the voltage drop across the resistor 325 becomes large, and the supplementary duty ratio becomes large accordingly (α2 in FIG. 3). In this case, the switching transistor 30 is driven with a large duty ratio (D22 in FIG. 3) at the time at which the electrical load 6 is applied, thereby causing the battery voltage to be lowered, which makes the output signal of the voltage comparator 313 high.

On the other hand, when the constant current produced by the variable constant current circuit 326 is set small, the voltage drop of the resistor 325 becomes small, and the supplementary duty ratio becomes small accordingly (α1 in FIG. 3) In this case, the switching transistor 30 is driven with a small duty ratio (D21 in FIG. 3) at the time at which the electrical load 6 is applied, thereby causing the battery voltage to be lowered, which makes the output signal of the voltage comparator 313 high.

The transmission of the gradual-excitation condition information from the ECU 4 to the power-generation control unit 3 can be performed by use of a PWM signal. In this case, the supplementary duty ratio α may be specified by the duty factor of the PWM signal, and the increasing rate of the duty ratio may be specified by the period of the PWM signal. Alternatively, the supplementary duty ratio α may be specified by the period of the PWM signal, and the increasing rate of the duty ratio may be specified by the duty factor of the PWM signal. Using the PWM signal makes it possible to obtain a better control response of the gradual excitation, because the supplementary duty ratio α and the increasing rate of the duty ratio of the exciting current can be set at a time.

Incidentally, if a variable resistor is used as the resistor 325, the value of the voltage drop across the resistor 325 can be changed by changing the resistance of the resistor 325 instead of changing the value of the constant current produced by the variable constant current circuit 326.

Figure 4:
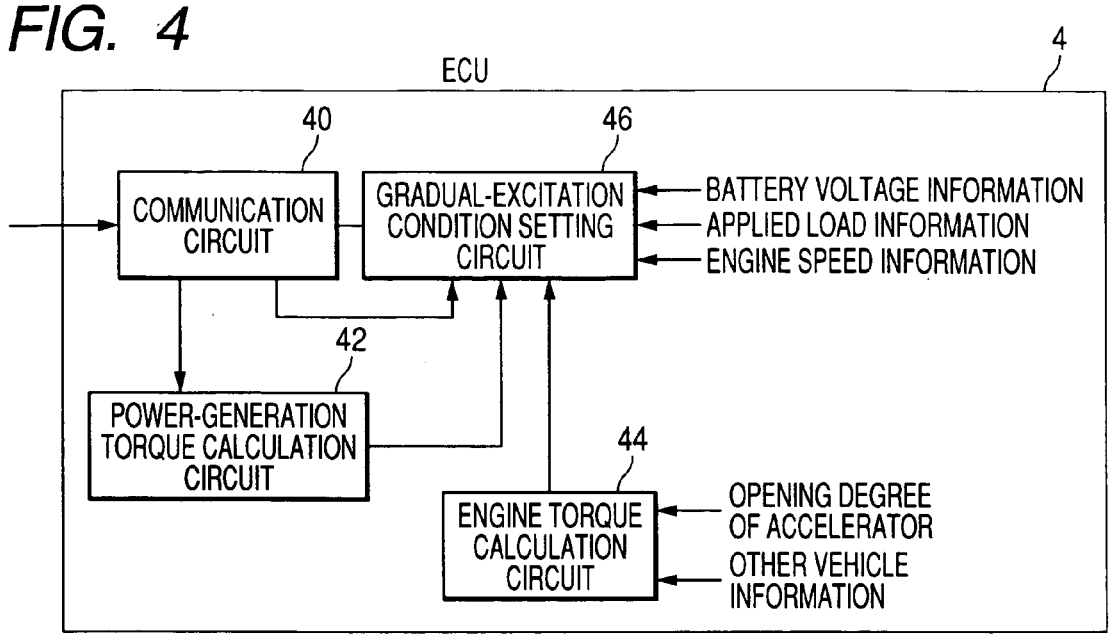
FIG. 4 is a diagram showing a configuration of a gradual-excitation control section of an engine control unit.

FIG. 4 shows a configuration of a gradual-excitation control section of the ECU 4. As shown in this figure, the gradual-excitation control section of the ECU 4 includes a communication circuit 40, a power-generation torque calculation circuit 42, an engine torque calculation circuit 44, and a gradual-excitation condition determination circuit 46. The communication circuit 40 is for performing communication with the power-generation control unit 3. The power-generation torque calculation circuit 42 is for calculating the power-generation torque on the basis of the generator information (the temperature, rotational speed, output voltage and exciting current of the vehicle generator 1) sent from the power-generation control unit 3. The engine torque calculation circuit 44 is for calculating the engine torque on the basis of the vehicle information including an opening degree of an accelerator. The gradual-excitation condition determination circuit 46 is for determining the gradual-excitation condition, under which the gradual-excitation control is performed, on the basis of the generator information received by the communication circuit 40, the power generation torque calculated by the power-generation calculation circuit 42, the engine torque calculated by the engine torque calculation circuit 44, battery voltage information, applied load information, engine speed information, etc. The applied load information includes information on a type of an applied electrical load, and information on a current of the applied electrical load (presence of the inrush current or temporal change of the load current, for example).

The impedance conversion circuit 320, resistors 325 and 327, variable constant-current circuit 326, gradual-excitation condition setting circuit 340, triangular-wave signal generation circuit 331, and voltage comparator 332 constitute an enhanced duty-cycle signal generating circuit. The variable resistor 315, capacitor 316, and gradual-excitation condition setting circuit 340 constitute a duty-ratio increasing rate setting circuit.

Figure 5:
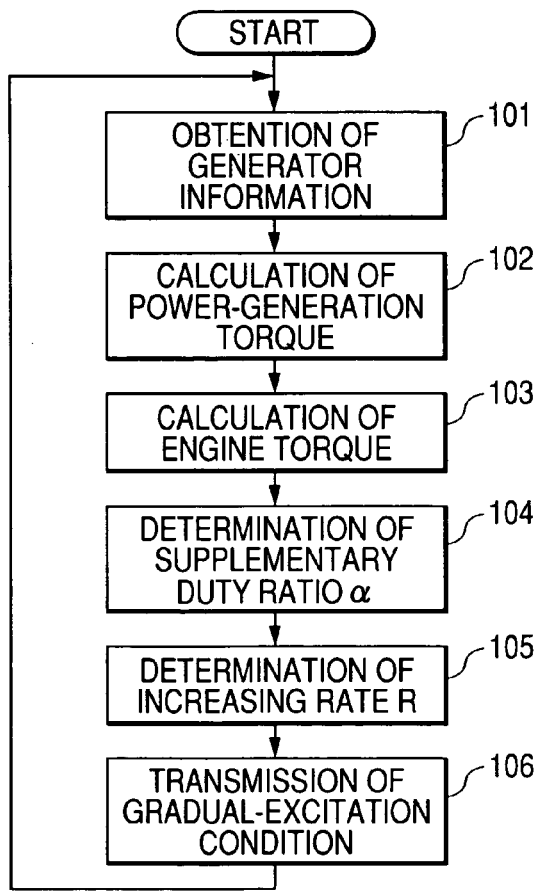
FIG. 5 is a flowchart showing an operation process performed by the engine control unit for determining a gradual-excitation condition.

Next, the operation of the vehicle power-generation control system having the above described configuration is explained. FIG. 5 is a flowchart showing the operation process performed by the ECU 4 for determining the gradual-excitation condition.

As shown in this flowchart, the gradual-excitation condition determination circuit 46 obtains at step S101 the generator information which the power-generation control unit 3 transmits regularly. The power-generation torque calculation circuit 42 calculates at step S102 the power-generation torque on the basis of the generator information. The engine torque calculation circuit 44 calculates at step S103 the engine torque on the basis of the opening degree of the accelerator and other vehicle information. After that, the gradual-excitation condition determination circuit 46 determines at steps S104 and S105 the supplementary duty ratio α and the increasing rate R of the duty ratio of the exciting current. At the subsequent step S106, the supplementary duty ratio α and the increasing rate R are sent to the power-generation control unit 3 as the gradual-excitation condition information in the form of the PWM signal. Thereafter, the operation process returns to step S101.

Upon receiving the gradual-excitation condition information, the gradual-excitation condition setting circuit 340 sets the constant current produced by the variable constant current circuit 326 at a value corresponding to the supplementary duty ratio α, and sets the resistance of the variable resistor 315 at a value corresponding to the increasing rate R.

The following is an explanation of how the value of the battery voltage drop when an electrical load having an inrush current is applied depends on the values of the supplementary duty ratio α and the increasing rate R of the duty ratio of the exciting current. When an electrical load having an inrush current such as an electric motor is applied, the value of the load current of the battery varies as shown in (A) in FIG. 6. In (C) in FIG. 6, there is shown a plurality of different temporal battery voltage variations corresponding to a plurality of different values of the supplementary duty ratio α (α1 and α2, α1>α2) and the increasing rate R (R1, R2 and R3 shown in (B) in FIG. 6, R1>R2>R3).

Figure 6:
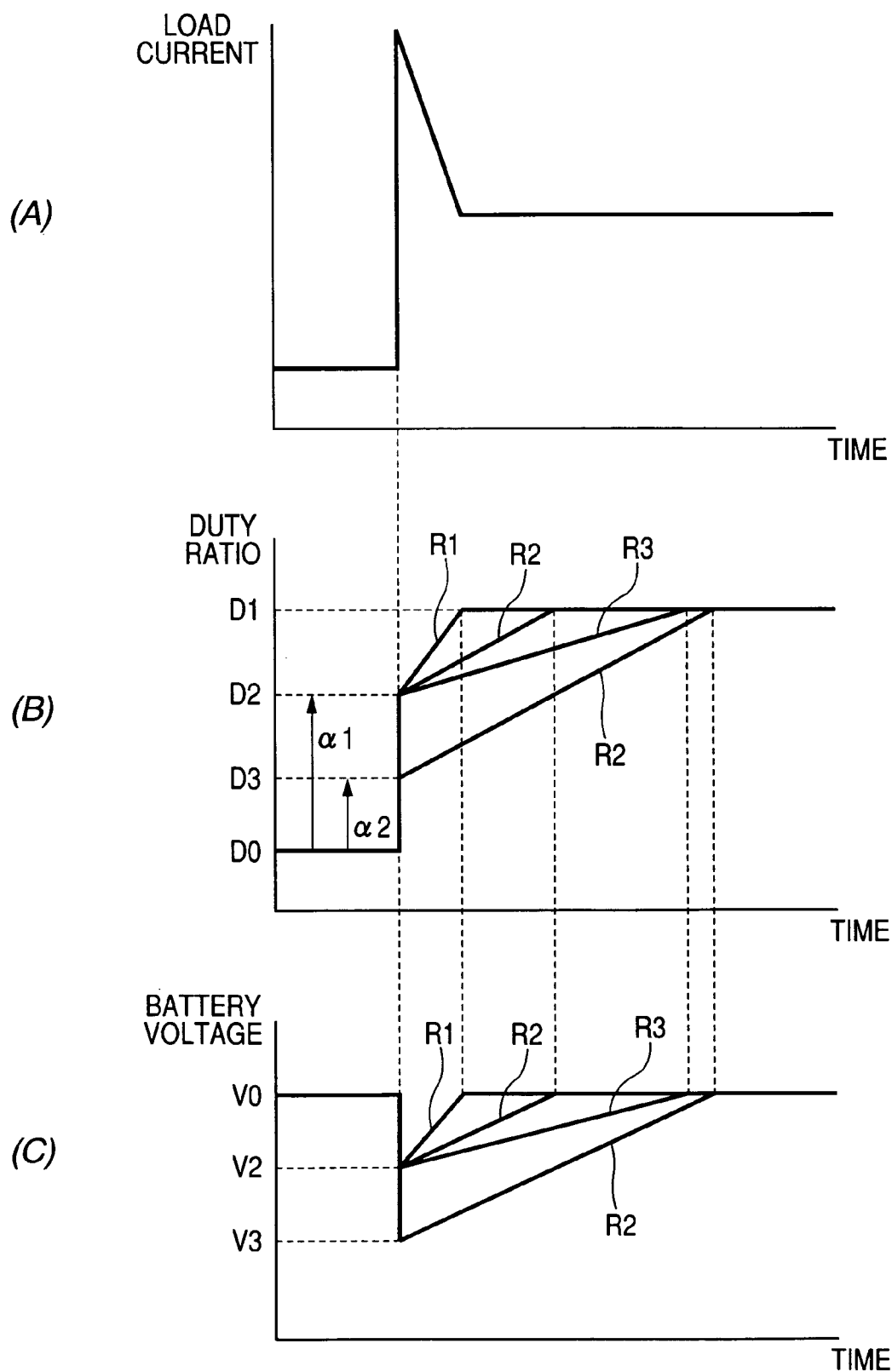
FIG. 6 is a diagram for explaining how a battery voltage drop depends on control of the duty ratio of the exciting current when an electrical load having an inrush current is applied.

As seen from (A), (B), (C) in FIG. 6, by setting the supplementary duty ratio α at a large value, the extent of the battery voltage drop can be eased. Also, by setting the increasing rate R at a large value, the battery voltage can be recovered quickly.

It is preferable to set the values of the supplementary duty ratio α and the increasing rate R at small values for the vehicle engine producing a small engine torque, because, if the supplementary duty ratio α is set at a too large value, the proportion of the engine torque used for electric power generation becomes abruptly large, thereby making the engine speed unstable. On the other hand, it is preferable to set the values of the supplementary duty ratio α and the increasing rate R at large values for the vehicle engine producing a large engine torque to recover the battery voltage quickly.

For the same reason, it is preferable to set the values of the supplementary duty ratio α and the increasing rate R at large values when an electrical load requiring a large step current such as an electric power steering system and ABS (Antilock Brake System) is applied, and to set them at small values when an electrical load that does not affect much the battery voltage is applied.

As explained above, with the present embodiment, it is possible to avoid the engine speed from becoming unstable by gradually increasing the duty ratio of the switching transistor 30 (or the duty ratio of the exciting current) when an electrical load is applied. In addition, if the supplementary duty ratio α is set at a smaller value while the vehicle engine idles, and changed to a larger value after the engine speed rises, it becomes possible to recover the battery voltage quickly without making the engine speed unstable when a large electrical load is applied. With the present embodiment, it is also possible to ease the battery voltage drop by sharply increasing the supplementary duty ratio α when an electrical load having an inrush current or an electrical load requiring a large step current such as the electric power steering system or the ABS is applied. This avoids malfunction of the ECU 4 and the vehicle safety running device such as the electric power steering system and the ABS due to the low output voltage of the vehicle generator 1, and the resultant battery voltage drop.

Furthermore, with the present embodiment, it is possible to achieve a balance between avoiding the battery voltage drop and stabilizing the engine speed by determining the value of the supplementary duty ratio α taking account of both the power-generation torque and the engine torque (or engine speed).

The configuration of the present embodiment may be modified so as to set the value of the supplementary duty ratio α depending on the state of the battery (battery voltage or battery charging current) to avoid the battery voltage from dropping excessively by the application of an electrical load when the battery voltage is relatively low.

The configuration of the present embodiment may be modified also so as to vary the increasing rate R as the supplementary duty ratio α increases. This configuration makes it possible to perform the gradual-excitation control depending on the engine torque characteristic and the variation characteristic of the load current of the battery after an electrical load is applied.

Although the gradual-excitation condition is determined on the side of the ECU 4 in this embodiment, it may be determined on the side of the power-generation control unit 3.

In order to remove the effect of the variation of the voltage applied to the variable resistor 315 due to the variation of the output voltage of the vehicle generator 1, a voltage conversion circuit configured to produce a voltage having a constant level irrespective of the level of an input voltage when the switching transistor 30 is in the off state may be interposed between the resistor 32 and the variable resistor 315. The level of the voltage produced by the voltage conversion circuit may be the same as the peak level of the triangular-wave signal outputted from the triangular-wave signal generation circuit 331.

In order to remove the nonlinearity of the increasing rate R which depends on the resistance of the variable resistor 315 and the capacitance of the capacitor 316, the average duty ratio detector circuit may be constituted by a digital integration circuit.

The above explained preferred embodiments are exemplary of the invention of the present application which is described solely by the claims appended below. It should be understood that modifications of the preferred embodiments may be made as would occur to one of skill in the art.

What is claimed is:

1. A vehicle power-generation control unit comprising:
a voltage detecting circuit detecting a generation voltage of a vehicle generator mounted on a vehicle and driven by an engine of said vehicle;
a switching device allowing an exciting current to flow into an exciting winding of said vehicle generator when said switching device is in an on state;
an average duty ratio detecting circuit detecting a temporal average duty ratio of said switching device on the basis of said generation voltage;
an enhanced duty-cycle signal generating circuit generating an enhanced duty-cycle signal having a duty ratio equal to said temporal average duty ratio detected by said average duty ratio detecting circuit added with a supplementary duty ratio determined depending on at least one of vehicle information representing a state of said vehicle and vehicle generator information representing a state of said vehicle generator; and
a driver circuit driving said switching device with said duty ratio of said enhanced duty-cycle signal generated by said enhanced duty-cycle signal generating circuit when said generation voltage detected by said voltage detecting circuit is lower than a predetermined target voltage.

2. The vehicle power-generation control unit according to claim 1, wherein said vehicle information includes at least one of a rotational speed of said engine, an engine torque of said engine, and an inrush current of an electrical load applied.

3. The vehicle power-generation control unit according to claim 1, wherein said vehicle generator information includes at least one of a temperature, a rotational speed, an output voltage, and an exciting current of said vehicle generator.

4. The vehicle power-generation control unit according to claim 1, wherein said vehicle information includes an output voltage of a terminal voltage of a vehicle battery charged by said vehicle generator.

5. The vehicle power-generation control unit according to claim 1, wherein said average duty ratio detecting circuit includes a duty-ratio increasing rate setting circuit constituted by an integration circuit for integrating a voltage corresponding to said generation voltage, said integration circuit having a time constant variable in accordance with an increasing ratio of said duty signal of said enhanced duty-cycle signal specified from outside.

6. The vehicle power-generation control unit according to claim 1, further comprising a communication circuit performing communication with an external control unit having a function of determining said supplementary duty ratio depending on at least one of said vehicle information and vehicle generator information, information representing said supplementary duty ratio being transmitted from said external control unit and received by said communication circuit to be supplied to said enhanced duty-cycle signal generating circuit.

7. The vehicle power-generation control unit according to claim 5, further comprising a communication circuit performing communication with an external control unit having a function of determining said supplementary duty ratio and said increasing rate of said duty ratio of said enhanced duty-cycle signal, first information representing said supplementary duty ratio being transmitted from said external control unit and received by said communication circuit to be supplied to said enhanced duty-cycle signal generating circuit, second information representing said increasing rate of said duty ratio of said enhanced duty-cycle signal being transmitted from said external control unit and received by said communication circuit to be supplied to said duty-ratio increasing rate setting circuit.

8. The vehicle power-generation control unit according to claim 7, wherein said communication circuit is configured to receive said first and second information transmitted in the form of a PWM signal, said first information being specified by one of a duty factor and a frequency of said PWM signal, said second information being specified by the other of said duty factor and said frequency of said PWM signal.

* * * * *